(12) United States Patent
Koshi et al.

(10) Patent No.: US 10,723,088 B2
(45) Date of Patent: Jul. 28, 2020

(54) FIBER-REINFORCED THERMOPLASTIC-RESIN BASE AND MOLDED ARTICLE OBTAINED THEREFROM

(71) Applicant: Toray Industries, Inc., Tokyo (JP)

(72) Inventors: Masayuki Koshi, Nagoya (JP); Hiroyuki Ome, Nagoya (JP); Eita Konno, Nagoya (JP); Shoma Ishida, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/335,782

(22) PCT Filed: Aug. 31, 2017

(86) PCT No.: PCT/JP2017/031321
§ 371 (c)(1),
(2) Date: Mar. 22, 2019

(87) PCT Pub. No.: WO2018/061597
PCT Pub. Date: Apr. 5, 2018

(65) Prior Publication Data
US 2020/0016844 A1 Jan. 16, 2020

(30) Foreign Application Priority Data
Sep. 29, 2016 (JP) ................. 2016-191088

(51) Int. Cl.
*B29C 70/20* (2006.01)
*B29C 70/52* (2006.01)
*B29K 77/00* (2006.01)
*B29K 307/04* (2006.01)

(52) U.S. Cl.
CPC ............ *B29C 70/205* (2013.01); *B29C 70/52* (2013.01); *B29K 2077/00* (2013.01); *B29K 2307/04* (2013.01)

(58) Field of Classification Search
CPC .................................................... B29C 70/205
USPC .......................................................... 428/114
See application file for complete search history.

(56) References Cited

FOREIGN PATENT DOCUMENTS

| JP | 61-193833 A | 8/1986 |
| JP | 63-060738 A | 3/1988 |
| JP | 03-140365 A | 6/1991 |
| JP | 08-164521 A | 6/1996 |

(Continued)

*Primary Examiner* — Brent T O'Hern
(74) *Attorney, Agent, or Firm* — DLA Piper LLP (US)

(57) ABSTRACT

A fiber-reinforced thermoplastic-resin base includes continuous reinforcing fibers aligned in parallel to each other and a thermoplastic resin is impregnated thereinto, wherein the base has a fiber volume content of 40-65 vol % and a dispersion parameter D of the fibers, determined by (i)-(iv), of 90% or more: (i) a cross-section of the fiber-reinforced thermoplastic-resin base that is perpendicular to the alignment direction of the reinforcing fibers is divided into a plurality of sections, and one of the sections is photographed, (ii) the photograph image of the section is divided into a plurality of square units each having a one-side length t, (iii) a dispersion parameter d is calculated, (iv) with respect to other sections, (i) to (iii) are repeatedly performed, and an average value of dispersion parameters d of the plurality of sections is dispersion parameter D.

10 Claims, 1 Drawing Sheet

(56) References Cited

FOREIGN PATENT DOCUMENTS

| | | |
|---|---|---|
| JP | 2007-138177 A | 6/2007 |
| JP | 2011-245756 A | 12/2011 |
| JP | 2013-159675 A | 8/2013 |
| JP | 2013-185117 A | 9/2013 |
| WO | 2012/133013 A1 | 10/2012 |
| WO | 2015/046290 A1 | 4/2015 |
| WO | WO-2015046290 A1 * | 4/2015 |

* cited by examiner

FIBER-REINFORCED THERMOPLASTIC-RESIN BASE AND MOLDED ARTICLE OBTAINED THEREFROM

TECHNICAL FIELD

This disclosure relates to a fiber-reinforced thermoplastic-resin base and a molded article using the same.

BACKGROUND

A fiber-reinforced thermoplastic-resin base made by impregnating a thermoplastic resin into continuous reinforcing fibers is excellent in specific strength and specific stiffness, high in weight reduction effect, and high in heat resistance and chemical resistance and, therefore, is preferably used for various applications such as transportation equipment such as aircraft, automobiles and the like, sports and electric/electronic parts. In recent years, due to the growing demand for weight reduction, replacement from metallic parts to resin parts, reduction in size and modularity of parts are progressing, mainly for aircraft and automobile applications and, therefore, development of materials is required to be more excellent in moldability and excellent in mechanical properties.

As a composite material for a structural material having excellent moldability and mechanical properties, for example, a fiber-reinforced thermoplastic-resin prepreg containing carbon fibers in a polyamide resin (for example, refer to JP-A-2013-159675) is known. Although such a prepreg is expected as a weight-reduction material to realize high mechanical properties to stably exhibit mechanical properties, it is necessary that the impregnation property of a matrix resin into portions between fiber bundles and reinforcing fibers uniformly disperse in the fiber-reinforced thermoplastic-resin base.

As a method of obtaining uniformity of the dispersion of reinforcing fibers, for example as described in JP-A-HEI 8-164521, a method is exemplified wherein a sectional image of a fiber-reinforced composite material is divided into sections each having an appropriate size and it is determined from a variation of the areal rates of reinforcing fibers in respective divided sections. In such a method, however, when reinforcing fibers are distributed, for example, as shown in FIG. 1, it is impossible to appropriately evaluate the density of reinforcing fibers in each section, and there is a possibility that in practice reinforcing fibers are dispersed in a nonuniform manner. Therefore, a fiber-reinforced thermoplastic-resin base with reinforcing fiber more uniformly dispersed is required.

Accordingly, it could be helpful to provide a fiber-reinforced thermoplastic-resin base with a thermoplastic resin as a matrix in which reinforcing fibers are more reliably uniformly dispersed and has a small variation in mechanical properties.

SUMMARY

We thus provide:

[1] A fiber-reinforced thermoplastic-resin base in which continuous reinforcing fibers are aligned in parallel to each other and a thermoplastic resin is impregnated thereinto, wherein the base has a fiber volume content in a range of 40-65 vol % and a dispersion parameter D of the fibers, determined by the following method, of 90% or more:

(i) a cross-section of the fiber-reinforced thermoplastic-resin base that is perpendicular to the alignment direction of the reinforcing fibers is divided into a plurality of sections, and one of the sections is photographed, (ii) the photograph image of the section is divided into a plurality of square units each having a one-side length t defined by equation (1), (iii) a dispersion parameter d defined by equation (2) is calculated, (iv) with respect to other sections, (i) to (iii) are repeatedly performed, and an average value of dispersion parameters d of the plurality of sections obtained from the cross-section is defined as the dispersion parameter D $1.5a \leq t \leq 2.5a$ ($a$: fiber diameter, $t$: one-side length of each unit)     (1)

Dispersion parameter $d$=(number of reinforcing-fiber-containing units within the section)/(number of all the units within the section)×100     (2).

[2] The fiber-reinforced thermoplastic-resin base according to [1], wherein a coefficient of variation of the dispersion parameter d is 4% or less.

[3] The fiber-reinforced thermoplastic-resin base according to [1] or [2], wherein a thickness of the base is 0.15 mm to 1.5 mm.

[4] The fiber-reinforced thermoplastic-resin base according to any one of [1] to [3], wherein the thermoplastic resin is either polyamide 6, polyamide 66 or a mixture thereof.

[5] The fiber-reinforced thermoplastic-resin base according to any one of [1] to [4], wherein the thermoplastic resin contains a polyamide copolymer comprising 30 to 90% by weight of a polyamide 6 component and 70 to 10% by weight of a polyamide 66 component.

[6] The fiber-reinforced thermoplastic-resin base according to any one of [1] to [5], wherein the reinforcing fibers are carbon fibers.

[7] The fiber-reinforced thermoplastic-resin base according to any one of [1] to [6], wherein a void ratio of the base is 2% or less.

[8] The fiber-reinforced thermoplastic-resin base according to any one of [1] to [7], wherein the base is obtained by pultrusion molding.

[9] A molded article comprising a fiber-reinforced thermoplastic-resin base according to any one of [1] to [8].

[10] A composite molded article obtained by integrating a fiber-reinforced thermoplastic-resin base according to any one of [1] to [8] or its molded article with a metal material or a molded article thereof, or a resin material or a molded article thereof.

It is thus possible to obtain a fiber-reinforced thermoplastic resin in which reinforcing fibers are dispersed with a high uniformity and excellent mechanical properties are stably exhibited with a small variation.

EXPLANATION OF SYMBOLS

Figure 1:
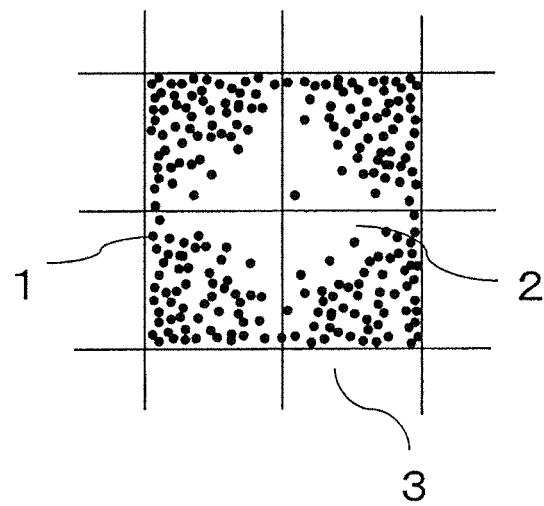
FIG. 1 is a schematic diagram showing an example of the distribution state of reinforcing fibers in a cross section of a fiber-reinforced thermoplastic resin.

1: reinforcing fiber
2: thermoplastic resin
3: fiber-reinforced thermoplastic-resin base

DETAILED DESCRIPTION

Hereinafter, our base materials and molded articles will be explained in detail together with examples.

The fiber-reinforced thermoplastic-resin base is formed by impregnating a thermoplastic resin base material into continuous reinforcing fibers aligned in parallel to each other. The continuous reinforcing fiber means that the reinforcing fiber is uninterrupted in the fiber-reinforced thermoplastic-resin base. As forms and arrangements of the reinforcing fibers, for example, those aligned in one direction, a woven fabric (cloth), a knitted fabric, a braided cord, a tow and the like are exemplified. Among them, it is preferred that the reinforcing fibers are arranged in one direction because the mechanical properties in a specific direction can be efficiently enhanced.

The kind of reinforcing fibers is not particularly limited, and carbon fibers, metal fibers, organic fibers and inorganic fibers are exemplified. Two or more of these may be used. By using carbon fibers as the reinforcing fibers, a fiber-reinforced thermoplastic-resin base having high mechanical properties while being light in weight can be obtained.

As the carbon fibers, for example, PAN-based carbon fibers made from polyacrylonitrile (PAN) fibers as a raw material, pitch type carbon fibers made from petroleum tar or petroleum pitch as a raw material, cellulose type carbon fibers made from viscose rayon, cellulose acetate and the like as a raw material, vapor-grown type carbon fibers made from hydrocarbons and the like as a raw material, and graphitized fibers thereof and the like can be exemplified. Among these carbon fibers, PAN-based carbon fibers are preferably used from the viewpoint that they are excellent in balance between strength and elastic modulus.

As the metal fibers, for example, fibers made of a metal such as iron, gold, silver, copper, aluminum, brass and stainless steel can be exemplified.

As the organic fibers, for example, fibers made of organic materials such as aramid, polybenzoxazole (PBO), polyphenylene sulfide, polyester, polyamide and polyethylene can be exemplified. As the aramid fibers, for example, para-aramid fibers excellent in strength and elastic modulus and meta-aramid fibers excellent in flame retardancy and long-term heat resistance can be exemplified. As the para-aramid fibers, for example, polyparaphenylene terephthalamide fibers, copolyparaphenylene-3,4'-oxydiphenylene terephthalamide fibers and the like can be exemplified, and as the meta-aramid fibers, for example, polymetaphenylene isophthalamide fibers and the like can be exemplified. As the aramid fibers, para-aramid fibers having a higher elastic modulus than the meta-aramid fibers are preferably used.

As the inorganic fibers, for example, fibers made of inorganic materials such as glass, basalt, silicon carbide and silicon nitride can be exemplified. As the glass fibers, for example, E glass fibers (for electric), C glass fibers (for corrosion resistant), S glass fibers, T glass fibers (high strength, high elastic modulus) and the like can be exemplified. Basalt fibers are those made of a fiberized material of a mineral basalt that are fibers very high in heat resistance. Basalt generally contains 9 to 25% by weight of FeO or $FeO_2$ which is a compound of iron, and 1 to 6% by weight of TiO or $TiO_2$ which is a compound of titanium, and it can also be made into fibers at a condition where in the molten state these components are increased.

Since the fiber-reinforced thermoplastic-resin base is often expected to serve as a reinforcing material, it is desirable to exhibit high mechanical properties, and to exhibit high mechanical properties, it is preferred to contain carbon fibers as the reinforcing fibers.

In the fiber-reinforced thermoplastic-resin base, the reinforcing fibers are usually constructed by arranging one or a plurality of reinforcing fiber bundles each formed from a number of single fibers bundled together. The total number of filaments (the number of single fibers) of the reinforcing fibers when one or more reinforcing fiber bundles are arranged is preferably 1,000 to 2,000,000. From the viewpoint of productivity, the total number of filaments of reinforcing fibers is more preferably 1,000 to 1,000,000, further preferably 1,000 to 600,000, and particularly preferably 1,000 to 300,000. The upper limit of the total number of filaments of the reinforcing fibers may be decided to keep good productivity, dispersibility and handling ability in consideration also of the balance with dispersibility or handling ability.

One reinforcing fiber bundle is preferably constructed by bundling 1,000 to 50,000 single fibers of reinforcing fibers having an average diameter of 5 to 10 μm.

As the thermoplastic resin, for example, polyesters such as polyethylene terephthalate (PET) resin, polybutylene terephthalate (PBT) resin, polytrimethylene terephthalate (PTT) resin, polyethylene naphthalate (PEN) resin and liquid crystal polyester resin, polyolefins such as polyethylene (PE) resin, polypropylene (PP) resin, polybutylene resin, styrene-based resins, and as other resins, polyoxymethylene (POM) resin, polyamide (PA) resin, polycarbonate (PC) resin, polymethylene methacrylate (PMMA) resin, polyvinyl chloride (PVC) resin, polyphenylene sulfide (PPS) resin, polyphenylene ether (PPE) resin, modified PPE resin, polyimide (PI) resin, polyamideimide (PAI) resin, polyetherimide (PEI) resin, polysulfone (PSU) resin, modified PSU resin, polyether sulfone resin, polyketone (PK) resin, polyether ketone (PEK) resin, polyether ether ketone (PEEK) resin, polyether ketone (PEKK) resin, polyarylate (PAR) resin, polyether nitrile (PEN) resin, phenolic-based resin, phenoxy resin, fluorine-based resin such as polytetrafluoroethylene resin, and further, thermoplastic elastomers of polystyrene-based resin, polyolefin-based resin, polyurethane-based resin, a polyester-based resin, polyamide-based resin, polybutadiene-based resin, polyisoprene-based resin, fluorine-based resin or the like, a copolymers or modified products thereof, and resins blended with two or more kinds may be used. In particular, the PPS resin is more preferably used from the viewpoint of heat resistance and chemical resistance, the polycarbonate resin and styrene resin are more preferably used from the viewpoint of appearance and dimensional stability of a molded article, and from the viewpoint of strength and impact resistance of a molded article, the polyamide resin is more preferably used. In particular, polyamide 6 and polyamide 66 are more preferred from the viewpoint of strength and heat resistance. Further, it is also practically preferable to mix these polyamide resins in accordance with required properties such as flowability and moldability. Although polyamide 6 and polyamide 66 may be blended, in particular, a polyamide 6/66 copolymer having a copolymerization ratio of 30 to 90% by weight of the polyamide 6 component and 70 to 10% by weight of the polyamide 66 component is preferable from the viewpoint of fiber dispersibility, a copolymerization ratio of 35 to 85% by weight of the polyamide 6 component and 65 to 15% by weight of the polyamide 66 component is more preferable, and a copolymerization ratio of 40 to 80% by weight of the polyamide 6 component and 60 to 20% by weight of the polyamide 66 component is further preferable.

The fiber-reinforced thermoplastic-resin base is formed by impregnating the aforementioned thermoplastic resin into continuous reinforcing fibers and, as needed, may further contain a filler, another kind of polymer, various additives and the like.

As the filler, any one, which is generally used as a resin filler, can be used, and the strength, stiffness, heat resistance and dimensional stability of the fiber-reinforced thermoplastic-resin base and the molded article using it can be further improved. As the filler, for example, fibrous inorganic fillers such as glass fibers, carbon fibers, potassium titanate whisker, zinc oxide whisker, aluminum borate whisker, aramid fiber, alumina fibers, silicon carbide fibers, ceramic fibers, asbestos fibers, plaster fibers and metal fibers, and non-fibrous inorganic fillers such as wollastonite, zeolite, sericite, kaolin, mica, talc, clay, pyrophyllite, bentonite, montmorillonite, asbestos, aluminosilicate, alumina, silicon oxide, magnesium oxide, zirconium oxide, titanium oxide, iron oxide, calcium carbonate, magnesium carbonate, dolomite, calcium sulfate, barium sulfate, magnesium hydroxide, calcium hydroxide, aluminum hydroxide, glass beads, ceramic beads, boron nitride, silicon carbide and silica, can be exemplified. Two or more of these may be contained. These fillers may be hollow. Further, they may also be treated with a coupling agent such as an isocyanate-based compound, an organic silane-based compound, an organic titanate-based compound, an organic borane-based compound or an epoxy compound. Further, as the montmorillonite, organized montmorillonite, in which interlayer ions are cation-exchanged with organic ammonium salts, may be used. If the fibrous filler is composed of discontinuous fibers, it can impart a function without impairing the reinforcement effect of the reinforcing fibers made of continuous fibers.

As the other kinds of polymers, for example, polyolefins such as polyethylene and polypropylene, elastomers such as polyamide elastomers and polyester elastomers, polyesters, polycarbonate, polyphenylene ether, polyphenylene sulfides, liquid crystal polymers, polysulfone, polyethersulfone, ABS resin, SAN resin, polystyrene and the like can be exemplified. Two or more of these may be contained. To improve the impact resistance of the fiber-reinforced terminal modified polyamide resin base obtained from the polyamide resin composition, an impact resistance improving agent such as a modified polyolefin such as a (co)polymer of an olefin-based compound and/or a conjugated diene-based compound, a polyamide-based elastomer, or a polyester-based elastomer is preferably used is preferably used.

As the (co)polymer of an olefin-based compound and/or a conjugated diene-based compound, an ethylene-based copolymer, a conjugated diene-based polymer, a conjugated diene-aromatic vinyl hydrocarbon-based copolymer and the like can be exemplified.

As the ethylene-based copolymer, for example, a copolymer of ethylene with an α-olefin having 3 or more carbon atoms, a non-conjugated diene, vinyl acetate, vinyl alcohol, an α, β-unsaturated carboxylic acid, a derivative thereof or the like, can be exemplified. As the α-olefin having 3 or more carbon atoms, for example, propylene, butene-1 and the like can be exemplified. As the non-conjugated diene, for example, 5-methylidene-2-norbornene, 5-ethylidene-2-norbornene, dicyclopentadiene, 1,4-hexadiene and the like can be exemplified. As the α, β-unsaturated carboxylic acid, for example, acrylic acid, methacrylic acid, ethacrylic acid, crotonic acid, maleic acid, fumaric acid, itaconic acid, citraconic acid, butane dicarboxylic acid and the like can be exemplified. As the derivatives of α, β-unsaturated carboxylic acids, for example, alkyl esters, aryl esters, glycidyl esters, acid anhydrides, imides and the like of the α, β-unsaturated carboxylic acids can be exemplified.

The conjugated diene-based polymer indicates a polymer of at least one conjugated diene. For example, 1,3-butadiene, isoprene (2-methyl-1,3-butadiene), 2,3-dimethyl-1,3-butadiene, 1,3-pentadiene and the like can be exemplified. Further, a part or all of the unsaturated bonds of these polymers may be reduced by hydrogenation.

The conjugated diene-aromatic vinyl hydrocarbon indicates a copolymer of a conjugated diene and an aromatic vinyl hydrocarbon, and may be a block copolymer or a random copolymer. As the conjugated diene, for example, 1,3-butadiene, isoprene and the like can be exemplified. As the aromatic vinyl hydrocarbon, for example, styrene and the like can be exemplified. Further, a part or all of the unsaturated bonds other than the double bonds other than the aromatic rings of the conjugated diene-aromatic vinyl hydrocarbon copolymer may be reduced by hydrogenation.

As concrete examples of the impact resistance improving agent, ethylene/methacrylic acid copolymers and ones in which a part or all of the carboxylic acid parts in these copolymers are made into salts with sodium, lithium, potassium, zinc or calcium, ethylene/propylene-g-maleic anhydride copolymer, ethylene/butene-1-g-maleic anhydride copolymer and the like can be exemplified.

As various additives, for example, antioxidants and heat resistance stabilizers (hindered phenol-based one, hydroquinone-based one, phosphite-based one and substitution products thereof, copper halide, iodine compound and the like), weatherproofing agents (resorcinol-based one, salicylate-based one, benzotriazole-based one, benzophenone-based one, hindered amine-based one and the like), releasing agents and lubricants (aliphatic alcohols, aliphatic amides, aliphatic bisamides, bisurea, polyethylene wax and the like), pigments (cadmium sulfide, phthalocyanine, carbon black and the like), dyes (nigrosine, aniline black and the like), plasticizers (octyl p-oxybenzoate, N-butylbenzene sulfonamide and the like), antistatic agents (alkyl sulfate type anion-based antistatic agent, quaternary ammonium salt type cation-based antistatic agent, nonionic antistatic agent such as polyoxyethylene sorbitan monostearate, betaine-based amphoteric antistatic agents and the like), flame retardants (hydroxide such as melamine cyanurate, magnesium hydroxide and aluminum hydroxide, ammonium polyphosphate, brominated polystyrene, brominated polyphenylene oxide, brominated polycarbonate, brominated epoxy resin, or a combination of these bromine-based flame retardants and antimony trioxide and the like) and the like can be exemplified. Two or more of these may be compounded.

The fiber-reinforced thermoplastic-resin base can be obtained by impregnating a thermoplastic resin into continuous reinforcing fibers.

As a method of impregnation, for example, a film method for impregnating a thermoplastic resin into a reinforcing fiber bundle by melting a film-like thermoplastic resin and pressurizing it, a comingle method for blending a fibrous thermoplastic resin and a reinforcing fiber bundle, thereafter, melting the fibrous thermoplastic resin, and impregnating the thermoplastic resin into the reinforcing fiber bundle by pressurizing, a powder method for dispersing powdery thermoplastic resin in the gaps of the fibers in a reinforcing fiber bundle, thereafter, melting the powdery thermoplastic resin, and impregnating the thermoplastic resin into the reinforcing fiber bundle by pressurizing, and a pultrusion method of immersing a reinforcing fiber bundle into the molten thermoplastic resin, and impregnating the thermoplastic resin into the reinforcing fiber bundle by pressurizing can be exemplified. The pultrusion method is preferred because various kinds of fiber-reinforced thermoplastic-resin bases having various thicknesses, fiber volume contents and the like can be manufactured.

The thickness of the fiber-reinforced thermoplastic-resin base is preferably 0.15 to 1.5 mm. If the thickness is 0.15 mm or more, the strength of a molded article obtained by using the fiber-reinforced thermoplastic-resin base can be improved. More preferably it is 0.2 mm or more. On the other hand, if the thickness is 1.5 mm or less, the thermoplastic resin can be impregnated into the reinforcing fibers more easily. More preferably it is 1 mm or less, further preferably 0.7 mm or less, and still further preferably 0.6 mm or less.

Further, in the fiber-reinforced thermoplastic-resin base, reinforcing fibers are contained at a content of 20 vol % (volume %) or more and 65 vol % or less in 100 vol % of the whole of the fiber-reinforced thermoplastic-resin base. By containing the reinforcing fibers at 20 vol % or more, the strength of a molded article obtained by using the fiber-reinforced thermoplastic-resin base can be more improved. More preferably it is 30 vol % or more, and further preferably 40 vol % or more. On the other hand, by containing the reinforcing fibers at 65 vol % or less, the thermoplastic resin can be impregnated into the reinforcing fibers more easily. More preferably it is 60 vol % or less, and further preferably 55 vol % or less.

The reinforcing fiber volume content Vf of the fiber-reinforced thermoplastic-resin base was determined by measuring the mass W0 (g) of the fiber-reinforced thermoplastic-resin base, thereafter heating the continuous fiber-reinforced thermoplastic-resin base at 500° C. for 30 minutes to burn off the thermoplastic resin component, and measuring the mass W1 (g) of the remaining reinforcing fibers, and it was calculated by equation (3)

$$Vf (\text{vol \%}) = (W1/\rho f) / \{W1/\rho f + (W0 - W1)/\rho r\} \times 100 \quad (3)$$

ρf: density of reinforcing fiber (g/cm³)
ρr: density of thermoplastic resin (g/cm³).

In the fiber-reinforced thermoplastic-resin base, the content of void (void ratio) contained in the fiber-reinforced thermoplastic base is preferably 2% or less. When the void ratio is 2% or less, mechanical properties of fiber-reinforced thermoplastic resin can be exhibited without impairing the mechanical properties of reinforcing fibers. The void ratio is more preferably 1.5% or less, further preferably 1% or less.

The void ratio of fiber-reinforced thermoplastic-resin base was determined by observing the cross section in the thickness direction of the fiber-reinforced thermoplastic-resin base as follows. A sample in which a fiber-reinforced thermoplastic-resin base was embedded with an epoxy resin was prepared, and the sample was polished until a cross section in the thickness direction of the fiber-reinforced thermoplastic-resin base could be observed well. The polished sample was photographed at an enlargement magnification of 400 times using an ultra-deep color 3D shape measurement microscope: VHX-9500 (controller unit)/VHZ-100R (measurement unit) (supplied by Keyence Corporation). The photographing range was set to the range of thickness of fiber-reinforced thermoplastic-resin base×500 μm of width. In the photograph image, the cross-sectional area of the base and the area of the air gap (void) were determined, and the impregnation ratio was calculated by equation (4)

$$\text{Void ratio (\%)} = (\text{total area of void occupied area}) / (\text{total area of fiber-reinforced thermoplastic-resin base}) \times 100 \quad (4).$$

In the fiber-reinforced thermoplastic-resin base, the dispersion parameter D defined by the following method is 90% or more. When the dispersion parameter D is 90% or more, the variation of the mechanical properties of the fiber-reinforced thermoplastic-resin base can be reduced.

Calculation of Dispersion Parameter D (i) A cross-section of the fiber-reinforced thermoplastic-resin base that is perpendicular to the alignment direction of the reinforcing fibers is divided into a plurality of sections, and one of the sections is photographed, (ii) the photograph image of the section is divided into a plurality of square units each having a one-side length t defined by equation (1), (iii) a dispersion parameter d defined by equation (2) is calculated, (iv) with respect to other sections, the procedures (i) to (iii) are repeatedly performed, and an average value of dispersion parameters d of the plurality of sections obtained from the cross-section is defined as the dispersion parameter D $$1.5a \leq t \leq 2.5a \quad (a: \text{fiber diameter}, t: \text{one-side length of each unit}) \quad (1)$$

$$\text{Dispersion parameter } d = (\text{number of reinforcing-fiber-containing units within the section}) / (\text{number of all the units within the section}) \times 100 \quad (2).$$

Evaluation Method

After embedding the fiber-reinforced thermoplastic-resin base as a specimen in epoxy resin "EPO QUICK" (registered trademark, supplied by Buehler Corporation) and curing at a room temperature for 24 hours, the cross-section of the fiber-reinforced thermoplastic-resin base which is almost perpendicular to the alignment direction of the reinforcing fibers was polished and then the polished surface was photographed while being changed in position by an ultra-deep color 3D shape measurement microscope: VHX-9500 (controller unit)/VHZ-100R (measurement unit) (supplied by Keyence Corporation).

An image analysis was performed on the cross-section photograph of the photographed fiber-reinforced thermoplastic-resin base, and it was divided into a plurality of approximately square units which do not overlap mutually, each having a one-side length determined by equation (1). By image analysis of these approximately square units in turn, units containing reinforcing fibers within the approximately square units were counted, and dispersion parameter d was calculated from equation (2).

In the-described image processing, the dispersion parameter d is determined by calculating the number of units containing reinforcing fibers in the unit relative to the total number of approximately square units that are sectioned. In principle, discriminant analysis is employed as binarization, but as the case may be, it is also possible to perform it manually while contrasting with photographs.

Figure 2:
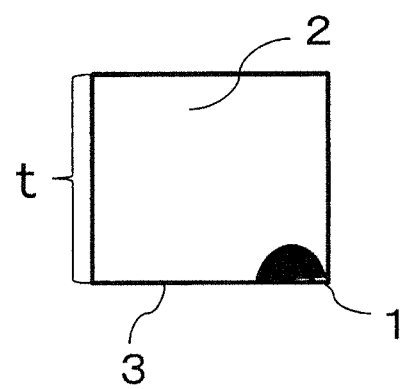
FIG. 2 is an enlarged schematic diagram showing an example of a state in which a reinforcing fiber exists in a square unit.
Figure 3:
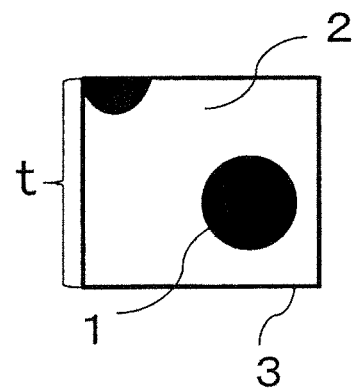
FIG. 3 is an enlarged schematic diagram showing another example of a state in which reinforcing fibers exist in a square unit.

Further, the reinforcing fiber contained within the square unit is counted if even a part thereof is contained within the unit as shown in FIG. 2, and even when the unit contains two or more reinforcing fibers as shown in FIG. 3, it is counted as one unit.

With respect to one polished surface, photographing is performed over 20 times or more while changing the photographing position, and with respect to the dispersion parameters d of fiber-reinforced thermoplastic-resin base obtained from the respective cross-section photographs, the average value is defined as dispersion parameter D and, from the value, it becomes possible to quantitatively evaluate the distribution state of the reinforcing fibers in the fiber-reinforced thermoplastic-resin base. When the number of photographs of cross-section cannot be secured sufficiently, it is also possible to take a plurality of photographs of a polished surface of a different cross-section of the fiber-reinforced thermoplastic-resin base, calculate dispersion parameters d, and finally determine a dispersion parameter D.

The size of the unit determined by equation (1) is decided from the relationship with the diameter of reinforcing fiber observed. If the size of the unit is smaller than the range of equation (1), the dispersion parameter converges to the volume content so that dispersibility cannot be represented accurately. On the other hand, if it is larger than the range of equation (1), the value becomes constant regardless of whether the dispersibility is good or not, which is not accurate. Therefore, the size of the unit must be in the range of equation (1).

Furthermore, the coefficient of variation of the dispersion parameters d is determined from equation (5). If the coefficient of variation exceeds 4%, the density variation of the reinforcing fibers increases depending upon position in the fiber-reinforced thermoplastic-resin base. Therefore, the coefficient of variation is preferably 4% or less, more preferably 3% or less Coefficient of variation=standard deviation of dispersion parameters $d$/average value of dispersion parameters $d$×100     (5).

A method of producing a fiber-reinforced thermoplastic-resin base will be explained in detail.

As a production apparatus, for example, it comprises a creel part capable of holding one or a plurality of bobbins wound with a reinforcing fiber bundle before impregnation with a matrix resin, a feed part that continuously feeds the reinforcing fiber bundle from the creel part, an impregnation die that adheres a molten matrix resin to the reinforcing fiber bundle continuously fed out, impregnating the resin thereinto by pressurizing, and forming it into a predetermined shape, and a cooling roll that cools and solidifies the molten matrix resin to form a fiber-reinforced thermoplastic-resin base.

In the impregnation process, the reinforcing fiber bundle continuously fed out is impregnated with the molten matrix resin. The reinforcing fiber bundle continuously fed out usually has a thin layered form. In the production apparatus, a plurality of bobbins each wound with a reinforcing fiber bundle, in which 1,000 to 50,000 continuous single fibers of reinforcing fibers are collected and bundled, are prepared, the reinforcing fiber bundles are drawn out from these plural bobbins, and arranged laterally to form a thin layered (tape-like) form as a whole, and the reinforcing fiber bundles are sent into the impregnation die in which the molten matrix resin is stored via a plurality of yarn passage guides. Further, it is preferred that the layered reinforcing fiber bundles are sent into the impregnation die in a state of being stacked in two or more layers. By stacking the layered reinforcing fiber bundles in two or more layers, adjustment of the dimensions is facilitated.

The impregnation die provided in the production apparatus is a rectangular parallelepiped facing the transfer direction of the reinforcing fiber bundles, and inside the impregnation die, the matrix resin supplied from a feeder is stored in a molten state. At the inlet of the impregnation die located upstream in the transfer direction of the reinforcing fiber bundles, an entrance hole through which the reinforcing fiber bundles can pass is formed, and through the entrance hole, the reinforcing fiber bundles are introduced into the impregnation die. The opened reinforcing fiber bundle is tensioned by bars and rolls provided inside the impregnation die, while the single fibers forming the reinforcing fiber bundle are aligned, bent in the direction of travel, and squeezed, they pass through the inside of the impregnation die, whereby the molten matrix resin is impregnated between the single fibers forming the reinforcing fiber bundle.

Further, in the impregnation process, if the force applied for impregnation is small, the production can be carried out without disturbing the arrangement of reinforcing fiber bundles, and the dispersibility of the reinforcing fibers can be improved. As a method of making the force applied for impregnation small, exemplified are a method of applying ultrasonic waves to the molten resin in the impregnation die, a method of vibrating the reinforcing fiber bundles, and a method of impregnating thin reinforcing fiber bundle layers with the resin and thereafter stacking the respective layers.

By continuously drawing out the reinforcing fiber bundles impregnated with the molten matrix resin from the impregnation die, they are formed in a predetermined shape before the matrix resin impregnated into the reinforcing fiber bundles is cured and, thereafter, in the cooling and solidification step, the molten matrix resin is cooled and solidified to form a fiber-reinforced thermoplastic resin with a certain shape. A die nozzle is provided at the outlet of the impregnation die, and the reinforcing fiber bundles drawn out by a take-off roll and impregnated with the matrix resin are shaped into a predetermined cross-sectional shape. The dimension of the die nozzle in the direction of transfer of the reinforcing fiber bundles is preferably a length that can realize a passage time of 0.1 second or more in which the reinforcing fiber bundles can pass through the die nozzle. More preferably it is 0.4 second or longer, and further preferably 1.0 second or longer. By a die nozzle size dimension which can realize a passage time of 0.1 second or more, the time required for dispersion of reinforcing fiber bundles is secured, and a fiber-reinforced thermoplastic-resin base with a good dispersibility of reinforcing fiber bundles can be obtained.

In the formed reinforcing fiber bundle, by being passed through a cooling roll through which cooling water is circulated, the molten matrix resin is cooled and solidified to form a fiber-reinforced thermoplastic-resin base with a certain shape.

The drawing tension of the reinforcing fiber bundles impregnated with the matrix resin is preferably 5 to 200 N, more preferably 5 to 150 N per 12,000 single fibers. If the drawing tension is less than 5 N, the reinforcing fiber bundles become easy to move so that the overlap with the adjacent reinforcing fiber bundles and the gap between adjacent fiber bundles are likely to occur, whereby the dispersibility of the reinforcing fiber bundles deteriorates. If it exceeds 200 N, the impregnation property of the matrix resin decreases due to convergence of the reinforcing fiber bundles. The drawing tension can be appropriately adjusted by the setting condition of the preliminary tension and the conveying speed. It is possible to increase the drawing tension by increasing the conveying speed. Further, the drawing tension can be appropriately adjusted by the shape of the roll and the arrangement of the rolls.

A molded article can be obtained by stacking one or more fiber-reinforced thermoplastic-resin bases in an arbitrary configuration and, thereafter, molding it while applying heat and/or pressure as required.

As a method of applying heat and/or pressure, for example, exemplified are a press molding method of placing fiber-reinforced thermoplastic-resin bases stacked at an arbitrary configuration in a mold or on a press plate and then pressing them by closing the mold or the press plate, an autoclave molding method of putting molding materials stacked at an arbitrary configuration into an autoclave and pressurizing and heating them, a bagging molding method of wrapping molding materials stacked at an arbitrary configuration with a film or the like and while depressurizing the inside of them and pressurizing them at an atmospheric pressure, heating them in an oven, a wrapping tape method of winding a tape while applying a tension to fiber-reinforced thermoplastic-resin bases stacked at an arbitrary configuration, and heating it in an oven, an internal pressure molding method of placing fiber-reinforced thermoplastic-resin bases stacked at an arbitrary configuration in a mold and pressurizing them by injecting a gas, a liquid or the like into a core set in the mold in a similar manner. In particular, since a molded article with few voids in the resulting molded article and excellent in appearance quality can be obtained, a molding method for pressing using a mold is preferably used.

In the fiber-reinforced thermoplastic-resin base or its molded article, integration molding such as insert molding and outsert molding, corrective treatment by heating, integration molding due to adhesion process excellent in productivity such as thermal welding, vibration welding, ultrasonic welding and the like, can be performed, and a composite can be obtained.

There are no particular restrictions on the molding base material integrated with the fiber-reinforced thermoplastic-resin base or its molded article or the molded article thereof, exemplified are a resin material or a molded article thereof, a metal material or a molded article thereof, an inorganic material or a molded article thereof. Among them, a resin material or its molded article or a metal material or its molded article can effectively exhibit the reinforcement effect of the fiber-reinforced thermoplastic-resin base. A resin material or a molded article thereof is preferable in view of adhesion strength to the fiber-reinforced thermoplastic-resin base, and a fiber-reinforced resin obtained by impregnating a matrix resin into a reinforcing fiber mat having a fiber length of 5 to 100 mm is more preferable from the viewpoint of moldability and mechanical properties. As a metal material or a molded article thereof, a high tensile strength steel, an aluminum alloy, a titanium alloy, a magnesium alloy and the like can be used, and it may be selected in accordance with the properties required for the metal layer, the metal member, and the metal part.

The matrix resin of a molding resin to be integrated with the fiber-reinforced thermoplastic-resin base or a molded article thereof may be the same kind of resin as the fiber-reinforced thermoplastic-resin base or its molded article, or may be a different kind of resin. To further increase the adhesive strength, the same kind of resin is preferred. In a different kind of resin, it is more preferable to provide a resin layer at the interface.

The fiber-reinforced thermoplastic-resin base or its molded article can be utilized by its excellent properties for various applications such as aircraft parts, automobile parts, electric/electronic parts, building materials, various containers, daily necessities, household goods and sanitary goods. The fiber-reinforced end-modified thermoplastic-resin base or its molded article is particularly preferably used for aircraft engine peripheral parts requiring stable mechanical properties, exterior parts for aircraft parts, vehicle skeleton as an automobile body part, automobile engine peripheral parts, automobile under-hood parts, automobile gear parts, automobile interior parts, automobile exterior parts, intake and exhaust parts, engine cooling water parts, automobile electric parts and electric/electronic parts applications.

Concretely, the fiber-reinforced end-modified polyamide resin or the molded article thereof is preferably used for aircraft engine peripheral parts such as fan blades, aircraft related parts such as landing gear pods, winglets, spoiler, edges, ladders, elevators, failings and ribs, automobile body parts such as various seats, front bodies, underbodies, various pillars, various members, various frames, various beams, various supports, various rails and various hinges, automobile engine peripheral parts such as engine covers, air intake pipes, timing belt covers, intake manifolds, filler caps, throttle bodies and cooling fans, automobile under-hood parts such as cooling fans, tops and bases of radiator tanks, cylinder head covers, oil pans, brake piping, tubes for fuel piping and exhaust gas system parts, automobile gear parts such as gears, actuators, bearing retainers, bearing cages, chain guides and chain tensioners, automobile interior parts such as shift lever brackets, steering lock brackets, key cylinders, door inner handles, door handle cowls, indoor mirror brackets, air conditioner switches, instrumental panels, console boxes, glove boxes, steering wheels, and trims, automobile exterior parts such as front fenders, rear fenders, fuel lids, door panels, cylinder head covers, door mirror stays, tailgate panels, licensed garnishes, roof rails, engine mount brackets, rear garnishes, rear spoilers, trunk lids, locker malls, malls, lamp housings, front grills, mud guards and side bumper, intake and exhaust parts such as air intake manifolds, intercooler inlets, turbochargers, exhaust pipe covers, inner bushes, bearing retainers, engine mounts, engine head covers, resonators and throttle bodies, engine cooling water-system parts such as chain covers, thermostat housings, outlet pipes, radiator tanks, alternators and delivery pipes, automobile electric parts such as connectors, wire harness connectors, motor parts, lamp sockets, sensor vehicle switches and combination switches, as electric/electronic parts, for example, electric parts such as electric generators, electric motors, transformers, current transformers, voltage regulators, rectifiers, resistors, inverters, relays, power contacts, open/close controllers, circuit breakers, switches, knife switches, multipole rods, motor cases, television housings, notebook computer housings and internal parts thereof, CRT display housings and internal parts thereof, printer housings and internal parts thereof, mobile phones, mobile personal computers, mobile terminal housings such as ones for handheld type mobiles and internal parts thereof, IC and LED-compatible housings, capacitor seats, fuse holders, various gears, various cases and cabinets, electronic parts such as connectors, SMT-compatible connectors, card connectors, jacks, coils, coil bobbins, sensors, LED lamps, sockets, resistors, relays, relay cases, reflectors, small switches, power supply parts, capacitors, variable capacitor cases, optical pickup chassis, oscillators, various terminal boards, transformers, plugs, printed circuit boards, tuners, speakers, microphones, headphones, small motors, magnetic head bases, power modules, Si power modules and SiC power modules, semiconductors, liquid crystals, FDD carriages, FDD chassis, motor brush holders, transformer members, parabolic antennas, computer related parts and the like.

EXAMPLES

Hereinafter, our base materials, molded articles and methods will be explained more specifically with reference to Examples, but this disclosure is not limited to the description of the Examples. The evaluations of properties in each Example and Comparative Example were carried out according to the following methods.

(1) Volume Content (Vf)

The volume content Vf of the fiber-reinforced thermoplastic-resin base obtained in each Example and Comparative Example was determined by measuring the mass W0 of the fiber-reinforced thermoplastic-resin base and then burning out the thermoplastic resin component of the fiber-reinforced thermoplastic-resin base by heating it in air at 500° C. for 30 minutes, measuring the mass W1 of the remaining reinforcing fibers, and calculating the volume content by equation (3)

$$Vf (\text{vol } \%) = (W1/\rho f)/\{W1/\rho f + (W0-W1)/\rho r\} \times 100 \quad (3)$$

$\rho f$: density of reinforcing fiber (g/cm$^3$)

$\rho r$: density of thermoplastic resin (g/cm$^3$).

(2) Tensile Strength

A laminate, prepared by aligning the fiber-reinforced thermoplastic-resin bases obtained in each Example and Comparative Example so that the fiber direction became one direction and stacking them so that the thickness became 1±0.2 mm, was put into a mold heated to a mold temperature of a melting temperature of matrix resin+30° C. Subsequently, after the laminate was hot pressed under a pressure of 3 MPa for 1 minute, it was cold pressed at a pressure of 3 MPa to obtain a molded plate. A test piece of 250 mm×15 mm was cut out from the molded plate with the fiber axis direction as the long side. A tensile test based on JIS K7165-2008 was performed on the obtained test piece by using "Instron" (registered trademark) universal testing machine Model 4201 (supplied by Instron Corporation), and the tensile strength was measured. Three measurements were carried out and the coefficient of variation was calculated from its average value and standard deviation.

The coefficient of variation of tensile strength was used as a criterion for evaluating the stability of mechanical properties, evaluated at the following two ranks, and the rank "○" was determined to be acceptable.

○: The coefficient of variation is less than 5%.

x: The coefficient of variation is 5% or more.

(3) Impregnation Property

A section in the thickness direction of the fiber-reinforced thermoplastic-resin base obtained in each Example and Comparative Example was observed as follows. A sample in which a fiber-reinforced thermoplastic-resin base was embedded with an epoxy resin was prepared, and the sample was polished until the cross section in the thickness direction of the fiber-reinforced thermoplastic-resin base could be observed well. The polished sample was photographed at an enlargement magnification of 400 times using an ultra-deep color 3D shape measurement microscope: VHX-9500 (controller unit)/VHZ-100R (measurement unit) (supplied by Keyence Corporation). The photographing range was set to the range of the thickness of the fiber-reinforced thermoplastic-resin base×a width of 500 μm. In the photograph image, the area of the fiber-reinforced thermoplastic-resin base and the area of the air gap (void) were determined, and the void ratio was calculated by equation (4)

$$\text{Void ratio (\%)} = (\text{total area of void occupied area})/(\text{total area of fiber-reinforced thermoplastic-resin base}) \times 100 \quad (4)$$

(4) Uniformity (i) A cross-section of the fiber-reinforced thermoplastic-resin base which is perpendicular to the alignment direction of the reinforcing fibers is divided into a plurality of sections, and one of the sections is photographed, (ii) the photograph image of the section is divided into a plurality of square units each having a one-side length t defined by equation (1), (iii) a dispersion parameter d defined by equation (2) is calculated, (iv) with respect to other sections, (i) to (iii) are repeatedly performed, and an average value of dispersion parameters d of the plurality of sections obtained from the cross-section is defined as the dispersion parameter D $$1.5a \leq t \leq 2.5a \ (a: \text{fiber diameter}, t: \text{one-side length of each unit}) \quad (1)$$

$$\text{Dispersion parameter } d = (\text{number of reinforcing-fiber-containing units within the section})/(\text{number of all the units within the section}) \times 100 \quad (2).$$

Evaluation Method

After embedding the sample of the fiber-reinforced thermoplastic-resin base in epoxy resin "EPO QUICK" (registered trademark, supplied by Buehler Corporation) and curing it at a room temperature for 24 hours, the cross section in the fiber reinforced thermoplastic-resin base almost perpendicular to the alignment direction of the reinforcing fibers was polished, and then the polished surface was photographed with an ultra-deep color 3D shape measurement microscope: VHX-9500 (controller unit)/VHZ-100R (measurement unit) (supplied by Keyence Corporation).

The cross-section photograph of each photographed fiber-reinforced thermoplastic-resin base fiber thermoplastic resin was divided into units each having an almost square shape with one side length of equation (1) that does not overlap mutually, using image analysis software. The image processing of the square units was carried out, the unit containing reinforcing fiber within the almost square unit was determined, and the dispersion parameter d was calculated by equation (2).

The dispersion parameters d thus obtained were photographed over 20 sheets or more, and its average value and the coefficient of variation were calculated.

In the Examples and Comparative Examples, the following materials were used as raw materials.

Carbon fiber bundle: T700S-12K, supplied by Toray Industries, Inc.

Thermoplastic resin: polyamide 6 and polyamide 6/66, "Amilan" (registered trademark) supplied by Toray Industries, Inc.

Example 1

Carbon fibers (indicated as "CF" in Table 1) were used as reinforcing fibers, and 16 bobbins wound with carbon fiber bundles were prepared, and carbon fiber bundles were sent out continuously from the respective bobbins through yarn guides. A matrix resin ("Amilan" (registered trademark): polyamide 6 [indicated as PA 6 in Table 1], supplied by Toray Industries, Inc.) quantitatively supplied from a filled feeder was impregnated into the carbon fiber bundles continuously sent out, in an impregnation die. Carbon fibers, impregnated with polyamide 6 resin as a matrix resin with a weak force at a degree that the dispersion of reinforcing fiber bundles in the impregnation die is not deteriorated, are continuously drawn from a nozzle of the impregnation die at a drawing speed of 1 m/min using a drawing roll. The passing time of the carbon fiber bundle through the nozzle was 4.0 seconds. The drawn carbon fiber bundles passed through a cooling roll, the polyamide 6 resin was cooled and solidified, and they were wound on a winding machine as a continuous fiber-reinforced polyamide resin base. The obtained fiber-reinforced polyamide resin base had a thickness of 0.3 mm and a width of 50 mm, and the reinforcing fibers were arranged in one direction. The obtained fiber-reinforced polyamide resin base was subjected to the aforementioned evaluation. The evaluation results are shown in Table 1.

Examples 2 to 7

Fiber-reinforced polyamide resin bases were obtained in manners similar to that in Example 1 other than conditions where the product thickness, the volume content and the matrix resin ("Amilan" (registered trademark) supplied by Toray Industries, Inc.: polyamide 6 or polyamide 6/66 [indicated as PA 6, PA 6/66 in Table 1]) were changed to the conditions shown in Table 1. The obtained fiber-reinforced polyamide resin bases were subjected to the evaluation. The evaluation results are shown in Table 1.

Comparative Example 1

16 bobbins wound with carbon fiber bundles were prepared, and the carbon fiber bundles were sent out continuously from the respective bobbins through yarn guides. A thermoplastic resin film ("Amilan" (registered trademark): polyamide 6) was laminated from both sides of the carbon fiber bundles continuously sent out to obtain a laminate. This laminate was heated to a predetermined temperature, the thermoplastic resin films were melt-impregnated into a sheet of the carbon fiber bundles, pressed, and cooled to obtain a fiber-reinforced polyamide resin base. The obtained fiber-reinforced polyamide resin base had a thickness of 0.3 mm and a width of 50 mm, and the reinforcing fibers were arranged in one direction. The evaluation results are shown in Table 1.

Comparative Examples 2 to 4

Fiber-reinforced polyamide resin bases were obtained in manners similar to that in Comparative Example 1 other than conditions where the product thickness, the volume content and the matrix resin ("Amilan" (registered trademark) supplied by Toray Industries, Inc.: polyamide 6 or polyamide 6/66) were changed to the conditions shown in Table 1. The obtained fiber-reinforced polyamide resin bases were subjected to the evaluation. The evaluation results are shown in Table 1.

TABLE 1

| | | | Example 1 | Example 2 | Example 3 | Example 4 | Example 5 | Example 6 | Example 7 |
|---|---|---|---|---|---|---|---|---|---|
| Raw material | Reinforcing fiber | — | CF | CF | CF | CF | CF | CF | CF |
| | Resin | — | PA6 | PA6 | PA6 | PA6/66 | PA6/66 | PA6/66 | PA6/66 |
| | Resin weight ratio | PA6 % | 100 | 100 | 100 | 85 | 90 | 40 | 30 |
| | | PA66 % | — | — | — | 15 | 10 | 60 | 70 |
| Tape state | Fiber volume content | % | 50 | 40 | 60 | 50 | 50 | 50 | 50 |
| | Thickness | mm | 0.3 | 0.3 | 0.3 | 0.3 | 0.3 | 0.3 | 0.3 |
| | Void ratio | % | 0.5 | 0.3 | 0.6 | 0.9 | 0.8 | 0.5 | 0.6 |
| Evaluation | Dispersion parameter D | % | 98 | 94 | 99 | 93 | 91 | 98 | 95 |
| | Coefficient of variation of dispersion parameters d | % | 1.9 | 1.8 | 0.5 | 2.9 | 3.5 | 2.3 | 2.5 |
| | Tensile strength | — | ◯ | ◯ | ◯ | ◯ | ◯ | ◯ | ◯ |

| | | | Comparative Example 1 | Comparative Example 2 | Comparative Example 3 | Comparative Example 4 |
|---|---|---|---|---|---|---|
| Raw material | Reinforcing fiber | — | CF | CF | CF | CF |
| | Resin | — | PA6 | PA6 | PA6/66 | PA6/66 |
| | Resin weight ratio | PA6 % | 100 | 100 | 95 | 5 |
| | | PA66 % | — | — | 5 | 95 |
| Tape state | Fiber volume content | % | 45 | 40 | 50 | 50 |
| | Thickness | mm | 0.3 | 0.15 | 0.3 | 0.3 |
| | Void ratio | % | 1.5 | 3.8 | 1.1 | 0.9 |
| Evaluation | Dispersion parameter D | % | 85 | 76 | 77 | 77 |
| | Coefficient of variation of dispersion parameters d | % | 6.0 | 4.9 | 5.3 | 5.1 |
| | Tensile strength | — | x | x | x | x |

In a comparison between Examples 1 to 3 and Comparative Examples 1 and 2, it can be understood that the fiber-reinforced polyamide resin bases in which reinforcing fibers were uniformly dispersed could stably exhibit mechanical properties.

INDUSTRIAL APPLICABILITY

The fiber-reinforced thermoplastic-resin base can be formed into a desired shape by an arbitrary molding method such as autoclave molding, press molding and film molding, but in particular, it is preferred to impregnate a matrix resin with a force weak at a degree that does not deteriorate the dispersion and to mold it into a desired shape by pultrusion molding. A molded article obtained by molding using the fiber-reinforced thermoplastic-resin base can be effectively applied, for example, to aircraft engine peripheral parts, aircraft interior parts, aircraft exterior parts, automobile applications such as vehicle skeletons, automobile engine peripheral parts, automobile under-hood parts, automobile gear parts, automobile interior parts, automobile exterior parts, intake and exhaust parts, engine cooling water parts and automobile electric parts, electric/electronic parts applications such as LED reflectors, SMT connectors and the like.

The invention claimed is:

1. A fiber-reinforced thermoplastic-resin base comprising continuous reinforcing fibers aligned in parallel to each other and a thermoplastic resin is impregnated thereinto, wherein the base has a fiber volume content of 40-65 vol % and a dispersion parameter D of the fibers, determined by (i)-(iv), of 90% or more:
   (i) a cross-section of the fiber-reinforced thermoplastic-resin base that is perpendicular to an alignment direction of the reinforcing fibers is divided into a plurality of sections, and one of the sections is photographed,
   (ii) a photograph image of one of the sections is divided into a plurality of square units each having a one-side length t defined by equation (1),
   (iii) a dispersion parameter d defined by equation (2) is calculated,
   (iv) (i) to (iii) are repeatedly performed, and an average value of dispersion parameters d of the plurality of sections obtained from a cross-section is defined as the dispersion parameter D $$1.5a \leq t \leq 2.5a \text{ } (a\text{: fiber diameter}, t\text{: one-side length of each unit}) \quad (1)$$

$$\text{Dispersion parameter } d = (\text{number of reinforcing-fiber-containing units within the section})/(\text{number of all the units within the section}) \times 100 \quad (2).$$

2. The fiber-reinforced thermoplastic-resin base according to claim 1, wherein a coefficient of variation of the dispersion parameter d is 4% or less.

3. The fiber-reinforced thermoplastic-resin base according to claim 1, wherein a thickness of the base is 0.15 mm to 1.5 mm.

4. The fiber-reinforced thermoplastic-resin base according to claim 1, wherein the thermoplastic resin is either polyamide 6, polyamide 66 or a mixture thereof.

5. The fiber-reinforced thermoplastic-resin base according to claim 1, wherein the thermoplastic resin contains a polyamide copolymer comprising 30 to 90% by weight of a polyamide 6 component and 70 to 10% by weight of a polyamide 66 component.

6. The fiber-reinforced thermoplastic-resin base according to claim 1, wherein the reinforcing fibers are carbon fibers.

7. The fiber-reinforced thermoplastic-resin base according to claim 1, wherein a void ratio of the base is 2% or less.

8. The fiber-reinforced thermoplastic-resin base according to claim 1, wherein the base is obtained by pultrusion molding.

9. A molded article comprising a fiber-reinforced thermoplastic-resin base according to claim 1.

10. A composite molded article obtained by integrating the fiber-reinforced thermoplastic-resin base according to claim 1 or its molded article with a metal material or a molded article thereof, or a resin material or a molded article thereof.

* * * * *